United States Patent [19]

Nishizawa et al.

[11] Patent Number: 4,962,742
[45] Date of Patent: Oct. 16, 1990

[54] FUEL INJECTION DEVICE FOR AN INTERNAL COMBUSTION ENGINE

[75] Inventors: Hiroyuki Nishizawa, Kyoto; Kimito Kashiwabara, Kameoka; Osamu Nako, Okazaki; Mitsuaki Ishii, Himeji; Kouichi Yamane, Himeji; Masaaki Miyazaki, Himeji; Ryoji Nishiyama, Amagasaki, all of Japan

[73] Assignees: Mitsubishi Jidosha Kogyo Kabushiki Kaisha; Mitsubishi Denki Kabushiki Kaisha, both of Japan

[21] Appl. No.: 376,780

[22] Filed: Jul. 7, 1989

[30] Foreign Application Priority Data

Jul. 7, 1988 [JP] Japan .................................. 63-169720

[51] Int. Cl.$^5$ ...................... F02D 41/10; F02D 41/12
[52] U.S. Cl. ..................................... 123/492; 123/493
[58] Field of Search ............... 123/492, 493, 422, 423; 364/431.07

[56] References Cited

U.S. PATENT DOCUMENTS 4,359,993 11/1982 Carlson ................................. 123/492
4,747,387 5/1988 Takao et al. ......................... 123/492

FOREIGN PATENT DOCUMENTS 58-144632 8/1983 Japan .

Primary Examiner—Andrew M. Dolinar
Attorney, Agent, or Firm—Sughrue, Mion, Zinn, Macpeak and Seas

[57] ABSTRACT

A fuel injection device for an automotive spark ignition internal combustion engine provided with a supercharger is disclosed, wherein the amount of fuel injected in synchrony with the crank angle signal is determined on the basis of the intake air pressure. The increment of the air pressure data over each fuel injection period is compared with a first threshold level to determine the first augmentation. The pressure data is averaged over each fuel injection period, and the increment of the averaged pressure data over a predetermined interval of time is compared with a second threshold level to determine the second augmentation. The fundamental amount is calculated on the basis of either the instantaneous or the averaged pressure data, in dependency on the value of the first augmentation amount. The total amount of fuel that is to be injected in synchrony with every predetermined numberth pulse of the crank angle signal is calculated in each injection cycle as a sum of the fundemental amount and the first and the second augmentation when the engine is judged to be in the supercharged state; when, on the other hand, the engine is judged to not to be in the supercharged state, the total amount of fuel is calculated as the sum of the fundamental amount and the first augmentation alone. The supercharged state is detected when both the intake air pressure and the number of rpm of the engine are above respective predetermined levels.

9 Claims, 8 Drawing Sheets

FUEL INJECTION DEVICE FOR AN INTERNAL COMBUSTION ENGINE

BACKGROUND OF THE INVENTION

This invention relates to fuel injection devices for spark ignition type internal combsution engines, and more particularly to control devices which detects the transient states of the engine and controls, in accordance with the detected transient state, the amount of fuel to be injected into the air inlet passage to the cylinders of internal combustion engines.

Conventionally, the supply of fuel to the spark ignition type internal combustion engines of passenger automobiles has been effected by carburetors; recently, however, fuel injectors are becoming increasingly common. These fuel injectors are capable of supplying a precisely controlled amount of fuel to the internal combustion engine so as to obtain an optimum air-fuel ratio. However, the supply of fuel to the combustion rooms in the cylinders of an engine may be delayed when the amount of air intake varies during the transient state, such as the slow accelerating transient state, of the engine; this delay of the fuel supply may be caused, for example, by: the delay in the detection of the amount of air intake; the delay in the calculation of the fuel amount; and the time lag resulting from the length of time which the fuel injected into the air intake pipes takes before it reaches the cumbustion rooms in the cylinders of the engine.

Thus, the correction of the fuel amount during the transient state of the engine is effected, for example, in this manner: the intake air pressure, which corresponds to the operating state of the engine, is detected, and the variation or increment the air pressure over a length of time is compared with a threshold level, to determine whether the engine is in the transient state or not; upon detection of the transient state of the engine, the amount of fuel is adjusted in accordance therewith.

Figure 1:
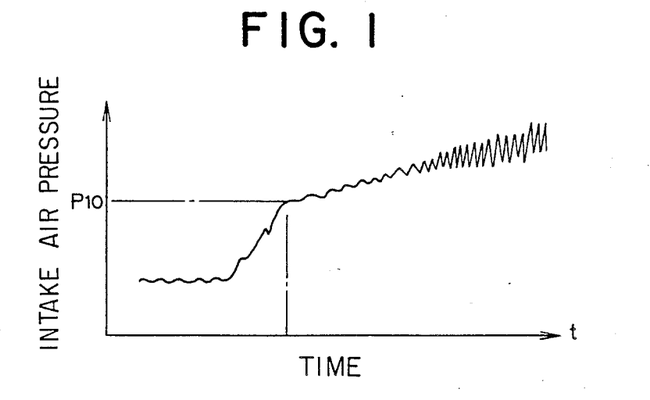
FIG. 1 is a diagram showing a typical increase curve of the intake air pressure of an internal combustion engine provided with a supercharger.

However, the detection signal of the intake air pressure containns ripples, i.e., small fluctuations resulting from the pulsations within the air inlet passage to the cylinders of the engine; in particular, in the case of the engines provided with a supercharger, such as a turbocharger, the ripples in the air pressure detection signal become extremely consipicuous in the supercharged region: FIG. 1 shows a typical variation curve of the intake air pressure of an engine provided with a supercharger, wherein the air pressure rises rapidly (with small ripples) to the atmospheric pressure $P_{10}$, and, thereafter, in the supercharged region, varies slowly, with, however, manifest ripples of large amplitudes.

For the purpose of attenuating these ripples and reducing the adverse effects thereof to the detection of the transient state of the engine, the fuel injection control device generally comprises an analog filter circuit: the detection signal of the intake air pressure is passed through the filter circuit to attenuate the ripples contained therein. However, the provision of an analog filter circuit is not sufficient. Namely, if the attenuation factor of the ripples through the analog filter circuit is increased, the delay in the detection of the transience of the egnine becomes manifest, with the result that the supply of fuel to the engine is delayed, and, as a result, the air-fuel ratio is deviated from its optimum level. On the other hand, if the ripples contained in the air pressure detection signal is not sufficiently attenuated by the analog filter circuit, the fluctuations of the increment resulting from the ripples may cause erroneous detection of the transience of the engine.

SUMMARY OF THE INVENTION

The primary object of this invention is therefore to provide a fuel injection device for an internal combustion engine which is quick and accurate in its response to the transient states of the engine, and in which the air-fuel ratio can be maintained always at the optimum level.

An additional object of this invention is to provide such a fuel injection device which is not adversely affected by the ripples contained in the intake air pressure signal.

A more specific object of this invention is to provide a fuel injection device for an internal combustion engine provided with a supercharger, whereby the detection of the slow transient state of the engine in the supercharged region can be effected accurately and reliably in spite of the ripples of large amplitudes that appear in the supercharged region.

The above objects of this invention are accomplished in accordance with the principle of this invention in a fuel injection device for an internal combustion engine which comprises, among others, the following elements or portions: (A) a pressure detector means for detecting the air pressure within the air inlet passage to the engine; (B) a portion for determining the first correction amount corresponding to the first transient state of the engine; (C) a portion for determining the second correction amount corresponding to the second (slow) transient state of the engine; (D) fundamental amount calculation means for calculating the fundamental amount of fuel that is to be injected; and (E) total amount calculation means for calculating the total amount of fuel that is to be injected.

The pressure detector means (A) may comprise an intake air pressure sensor, an analog filter, and an A/D converter. On the other hand, the portion (B) comprises: a first increment calculation means for calculating an increment of the pressure data outputted from the pressure detector means (A) over a first interval of time; a first comparator means for comparing with a first threshold level the increment of the pressure data over the first interval of time, so as to detect a first transient state of the internal combustion engine; and a first correction amount calculation means for calculating, in accordance with a detection of the first transient state by the first comparator means, a first transient correction amount corresponding to the increment of the pressure data over the first interval of time. Further, the portion (C), which is characteristic of this invention, comprises an averaging means for averaging the pressure data outputted from the pressure detector means (A) over each passage of an interval of time; a second increment calculation means for calculating an increment of the averaged pressure data outputted from the averaging means, over a second interval of time which is longer than the first interval of time; a second comparator means for comparing with a second threshold level the increment of the averaged pressure data over said second interval of time, so as to detect a second transient state of the internal combustion engine; and a second correction amount calculation means for calculating, in accordance with a detection of the second transient state, a second transient correction amount corresponding to the increment of the averaged pressure data over the second interval of time. The fundamental amount calculation means (D) calculates the fundametnal amount on the basis of the pressure data (either the instantaneous pressure data outputted from the pressure detector means (A) or the averaged pressure data outputted from the averaging means of portion (C)). The total amount calculation means (E) calculates the total amount of fuel from the first and second correction amounts and said fundamental amount.

Thus, according to this invention, the second transient comparator means of portion (C) detects the second (slow) transient state by comparing with a second threshold level the increment of the averaged pressure data over the second (longer) interval of time; thus the detection of the second transient state can be effected reliably and accurately without being adversely affected by the ripples which may be contained in the pressure data. Further, the second correction amount calculation means of the same portion (C) calculates the second correction amount on the basis of the increment of the averraged pressure data in accordance with the detection of the second transient state, and the total amount of fuel that is to be injected is calculated by the total amount calculation means (E) on the basis of the first and the second correction amounts, as well as of the fundamental amount. Thus, the total amount can be adjusted precisely to the transient state of the engine even when the engine is in a slow accelerating state in which the ripples of large amplitudes appear in the intake air pressure signal.

Where the internal combustion engine comprises a supercharge, it is preferred that the fuel injection device further comprises supercharged state detector means for detecting a supercharged state of the internal combustion engine. Then, the total amount calculation means (E) calculates the total amount as a sum of the first and second transient correction amounts and the fundamental amount when the supercharged state detecctor means detects a supercharged state of the engine, whereas, when a supercharged state is not detected by the supercharged state detector means, it calculates the total amount as a sum of the first transient correction amount and the fundamental amount.

BRIEF DESCRIPTION OF THE DRAWINGS

The novel features which are believed to be characteristic of this invention are set forth with particularity in the appended claims. This invention itself, however, both as to its organization and method of operation, together with further objects and advantages thereof, may best be understood from the following detailed description of the preferred embodiments, taken in conjunction with the accompanying drawings, in which:

In the drawings, like reference numerals represent like or corresponding portions.

DETAILED DESCRIPTION OF THE PREFERRED EMBODIMENTS

Referring now to the accompanying drawings, the preferred embodiments of this innvention are described.

Figure 2:
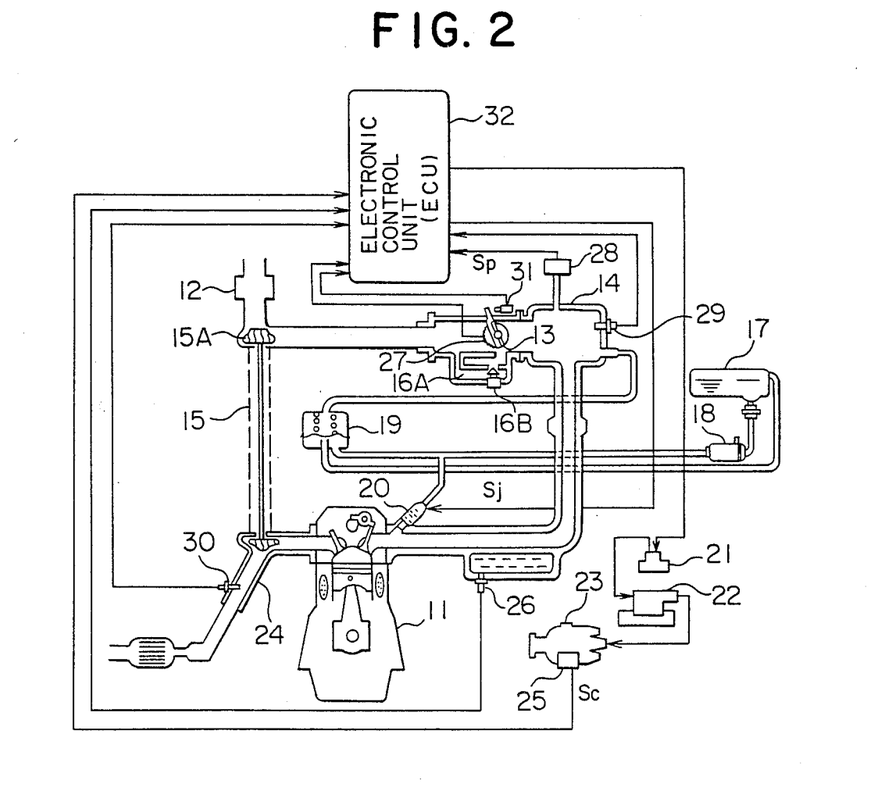
FIG. 2 is a diagramatic view of an internal combustion engine provided with a supercharger and a fuel injection device according to this invention.

First, referring to FIG. 2 of the drawings, let us describe the overall organization of a spark ignition type internal combustion engine provided with a fuel injector and an electronic control unit according to the present invention. The following description is made of the case where the engine 11 is a four-cycle three-cylinder engine; however, it will be easy for those skilled in the art to apply the principle of this invention to other types of spark ingnition internal combustion engines.

When the engine 11 is driven, the air for the combustion is taken into the cylinders of the engine 11 through an air cleaner 12, a throttle valve 13, and a surge tank 14. A compressor 15A of a supercharger 15 is disposed within the air intake pipe between the air cleaner 12 and the throttle valvle 13; when a rapid acceleration of the automobile is neccessary, such as when the automobile is in a racing contest, the intake air pressure is raised by the operation of the compressor 15A of the supercharger 15 so as to suply a larger amount of air-fuel mixture to the engine 11. When the compressor 15A of the supercharger 15 operates, the intake air pressure increases rapidly to the atmospheric pressure $P_{10}$, but thereafter with a slower rate of increase and with conspicuous ripples of large amplitude, as shown in FIG. 1. During the idling period, on the other hand, the throttle valve 13 is closed, and the air for combustion is introduced into the cylinders of the engine 11 via the bypass passage 16A bypassing the throttle valve 13, wherein the opening of the bypass passage 16A is controlled by a thermowax type fast idling valve 16B. The fuel (i.e. gasoline) is supplied from the fuel tank 17 by means of a fuel pump 18 and through a fuel pressure regulator 19 to fuel injectors 20 disposed in each air intake pipe supplying the air-fuel mixture to the respective cylinders of the engine 11; the injection of fuel from the injectors 20 is effected in synchrony with the ignition timing as described below.

Further, the ignition signals are supplied from an ignition driving circuit 21, through an ignition coil 22 and a distributor 23 in this order, to ignition plugs (not shown) disposed in each cylinder of the engine 11. The exhaust gas produced by the combustion in the cylinders of the engine 11 is exhausted into the atmosphere through the exhaust manifold 24, etc.; when the exhaust gas is exhausted into the atmosphere, the supercharger 15 is operated to facilitate the exhaustion.

Figure 4A:
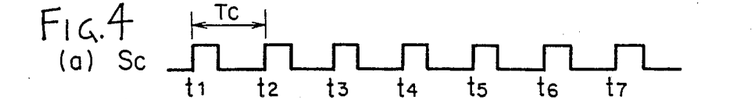
FIGS. 4(a), 4(b) and 4(c) are diagrams showing the waveforms of the signals generated in the fuel injection control device of FIGS. 2 and 3.

On the other hand, the sensor system of the engine 11 has the following organization: A crank angle sensor 25 mounted on the distributor 23 detects the numbers of revolutions per minute (rpm) of the crank shaft of the engine 11, and outputs a pulse-shaped crank angle signal Sc whose frequency corresponds to the number of rpm; for example, the crank angle sensor 25 outputs a crank angle signal Sc whose pulses rise at 70 degrees BTDC (before top dead center) and decay at TDC (top dead center). Thus, the crank angle signal Sc has the waveform as shown in FIG. 4 (a), whose period Tc between the leading edges (shown at $t_1$ through $t_7$ in the figure) of two adjacent pulses varies inversely proportionally to the number of rpm Ne of the engine 11. Further, a temperature sensor 26 detects the temperature of the coolant water of the engine 11; an opening degree sensor 27 detects the opening degree of the throttle valve 27; a pressure sensor 28 disposed in the surge tank 14 detects the absolute pressure within the air inlet passage to the engine 11 and outputs a corresponding pressure signal Sp; an intake air temperature sensor 29 disposed at the surge tank 14 detects the temperature of the intake air; an air/fuel ratio sensor 30 disposed in the exhaust manifold 24 detects the concentration of the oxygen in the exhaust gas from which the air/fuel ratio is determined; and an idling switch 31 outputs a signal when the throttle valve 13 is closed during an idling period. The signals thus outputted from the above sensors 25 through 30 and the switch 31 are supplied to an electronic control unit (ECU) 32; in response thereto, the electronic control unit 32 determines the amount of fuel to be injected from the injectors 20 according to the principle of this invention, as described below, and outputs an injector driving signal Sj to the fuel injectors 20 by which it controls, in accordance with the determined amount of fuel that is to be injected, the length of time during which the valves of the injectors 20 are to be opened. Further, the electronic control unit 32 controls the operation of the ignition driving circuit 21 in a manner well known to those skilled in the art.

Figure 3:
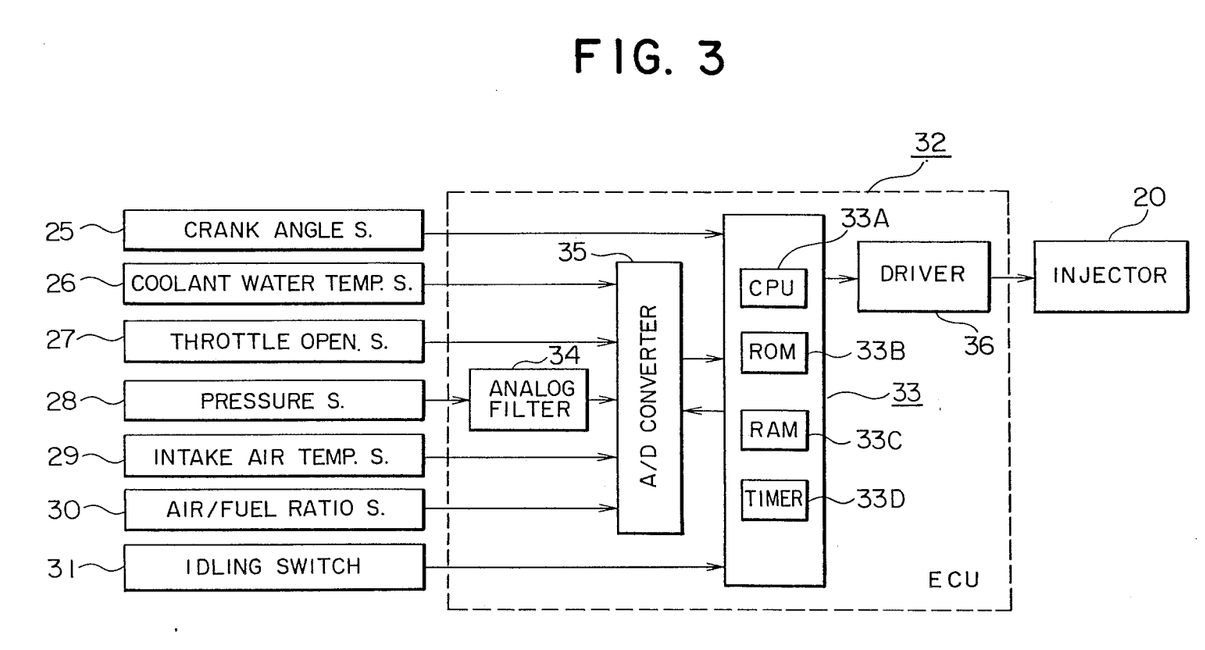
FIG. 3 is a block diagram showing the organization of the electronic control unit for controlling the operation of the engine of FIG. 2.
Figure 6:
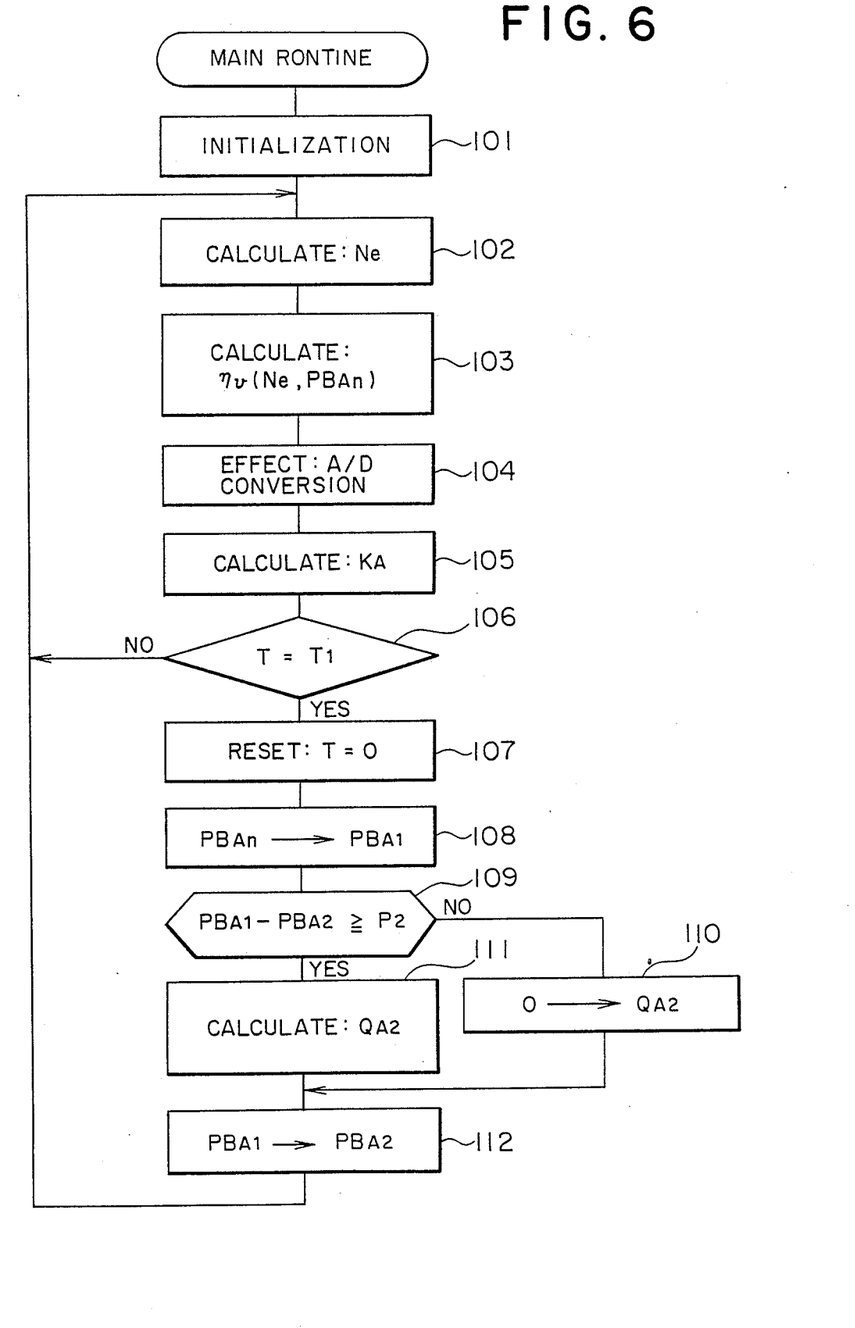
FIGS. 6, 7, 8(a) and 8(b) are flowcharts showing an example of the steps followed by the fuel injection control device according to this invention.
Figure 7:
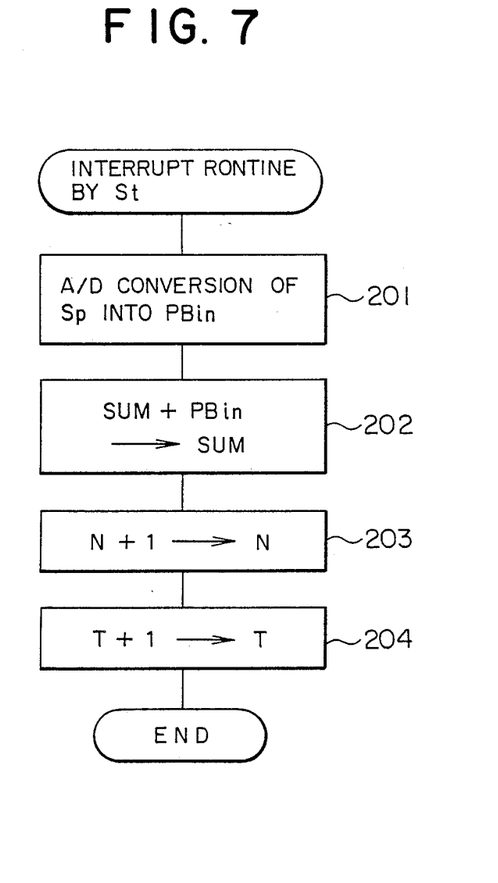
Figure 8A:
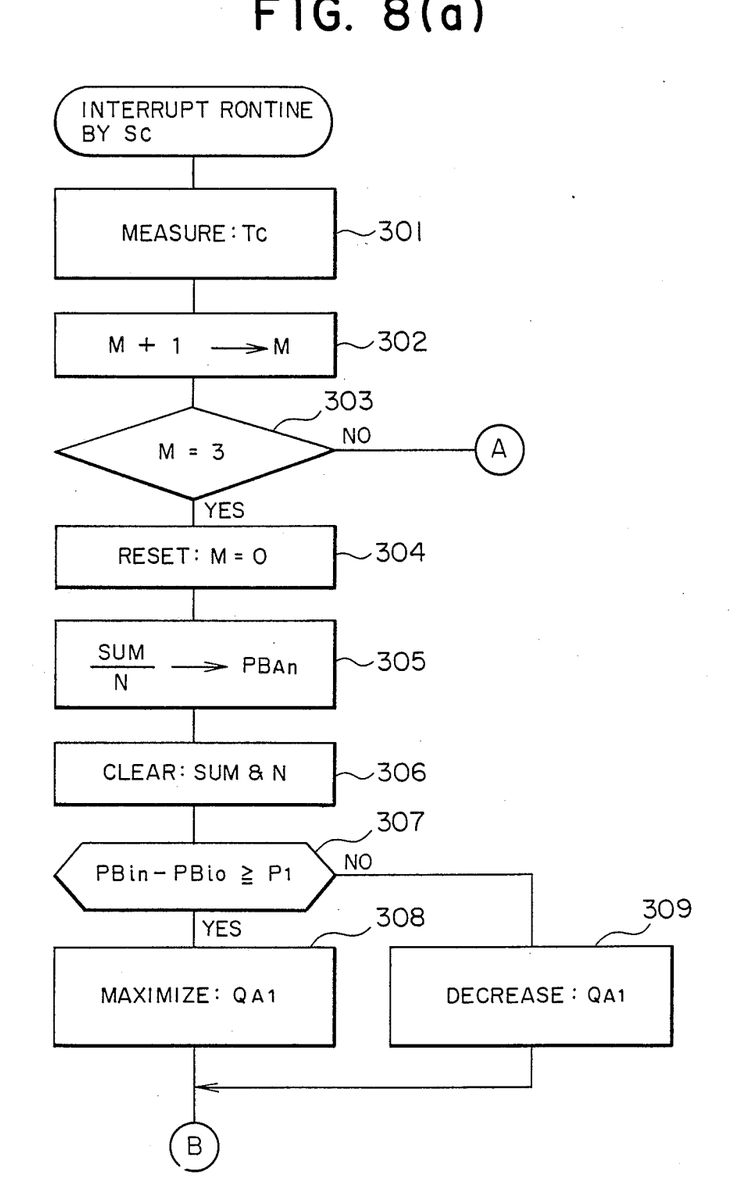
Figure 8B:
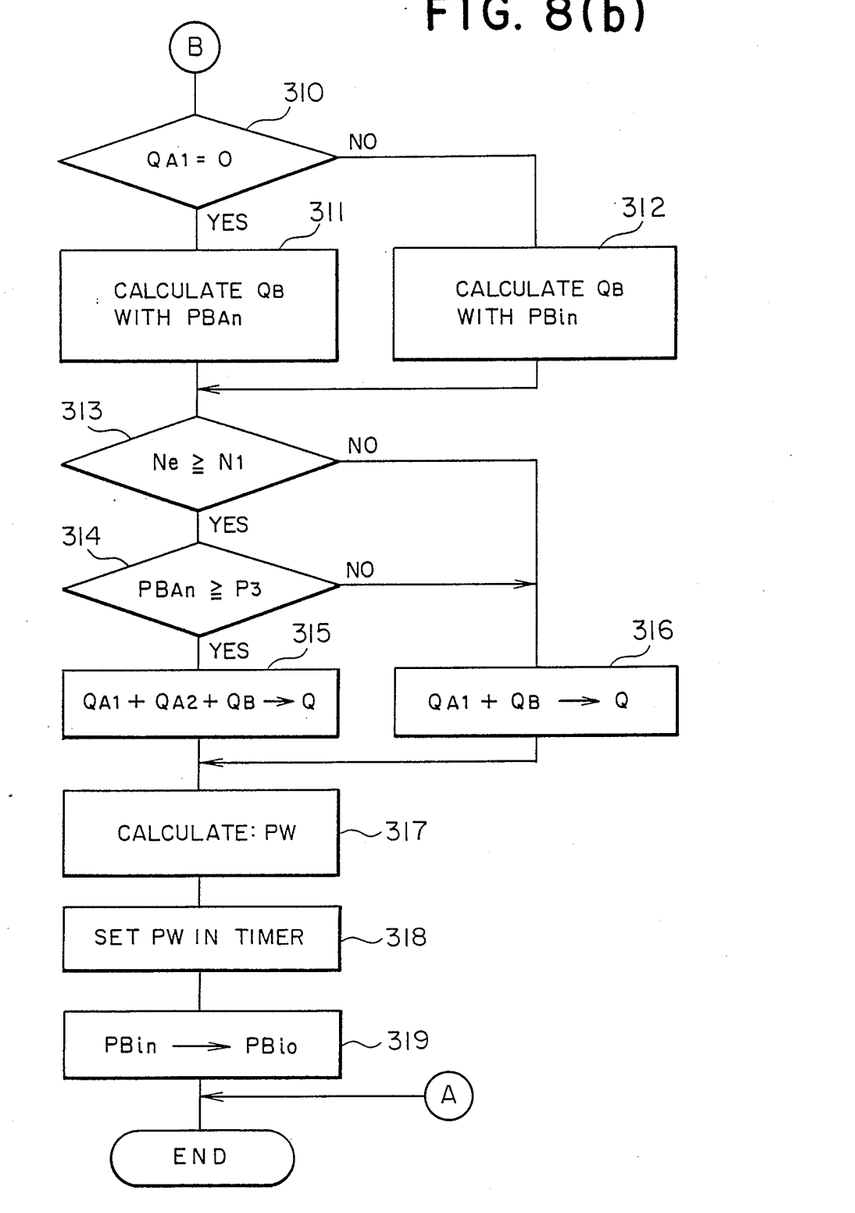

Next, referring to FIG. 3 of the drawings, let us describe the interior organization of the electronic control unit 32 from the view point of the physical implementation thereof. (The functional organization of the control unit 32, especially that of the microcomputer 33, will be described later in reference to FIG. 5.) As shown in the figure, the control unit 32 comprises a microcomputer 33, an analog filter circuit 34, an A/D converter 35, and a driver circuit 36. The microcomputer 33, which effects various operations and judgements (described hereinbelow in reference to the block diagram of FIG. 5 and the flowcharts of FIGS. 6 through 8) according to this invention comprises: a CPU (central processing unit) 33A for executing such operatons and judgements; a ROM (read-only memory) 338 for storing the programs, etc., of such operations and judgements, examples of which programs are illustrated in FIGS. 6 through 8; a RAM (random access memory) 33C functioning as a working memory for storing data detected by the sensors, etc.; and a timer 33D in which the length of time during which the injectors 20 are driven to open the valves thereof is set in each fuel injection cycle. The input ports of the microcomputer 33 are coupled to the outputs of the crank angle sensor 25, the idling switch 31, and the A/D converter 35, while the output ports thereof are coupled to the driver circuit 36 and, for the purpose of outputting reference signals, to the A/D converter 35.

The analog filter circuit 34 having an input coupled to the output of the pressure sensor 28 comprises a low pass filter that reduces the ripples contained in the pressure signal Sp outputted from the sensor 28.

Figure 4B:
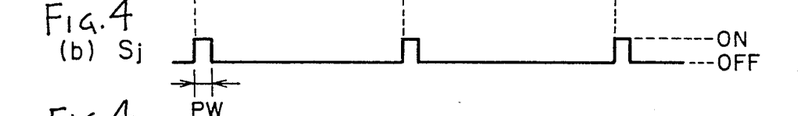
Figure 4C:
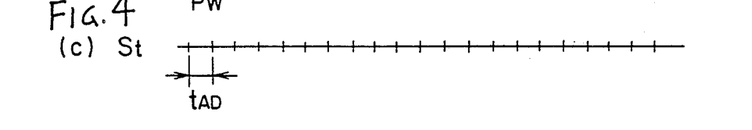

The A/D converter 35 converts into corresponding digital signals the analog signal outputted from the filter circuit 34 and the analog detection signals outputted from the coolant water temperature sensor 26, the throttle opening degree sensor 27, the intake air temperature sensor 29 and the air/fuel ratio sensor 30. The A/D converersion of the pressure signal Sp passing through the analog filter circuit 34 is effected by the A/D converter 35 at a predetermined fixed interval $t_{AD}$ (e.g. 2.5 milliseconds), as represented by the A/D conversion timing signal St shown in FIG. 4 (c); a plurality of these intervals $t_{AD}$ are contained within each fuel injection period 3T.

On the other hand, the driver circuit 36 outputs, in response to the injection control signal outputted from the microcomputer 33, a pulse-shaped injector driving signal Sj. As shown in FIG. 4 (b), the injector driving signal Sj consists of a pulse train whose pulse width PW corresponds to the length of time during which the injectors 20 are driven so that the valves of the injectors 20 are opened; since the engine 11 comprises three cylinders, pulses of the signal Sj are generated in synchrony with every third pulse of the crank angle signal Sc. Thus, in response to the injector driving signal Sj, the injectors 20 inject controlled amounts of fuel, in the intervals PW biginning at instants $t_1$, $t_4$, and $t_7$ respectively in the figure, simultaneously for all the three cylinders of the engine 11.

Figure 5:
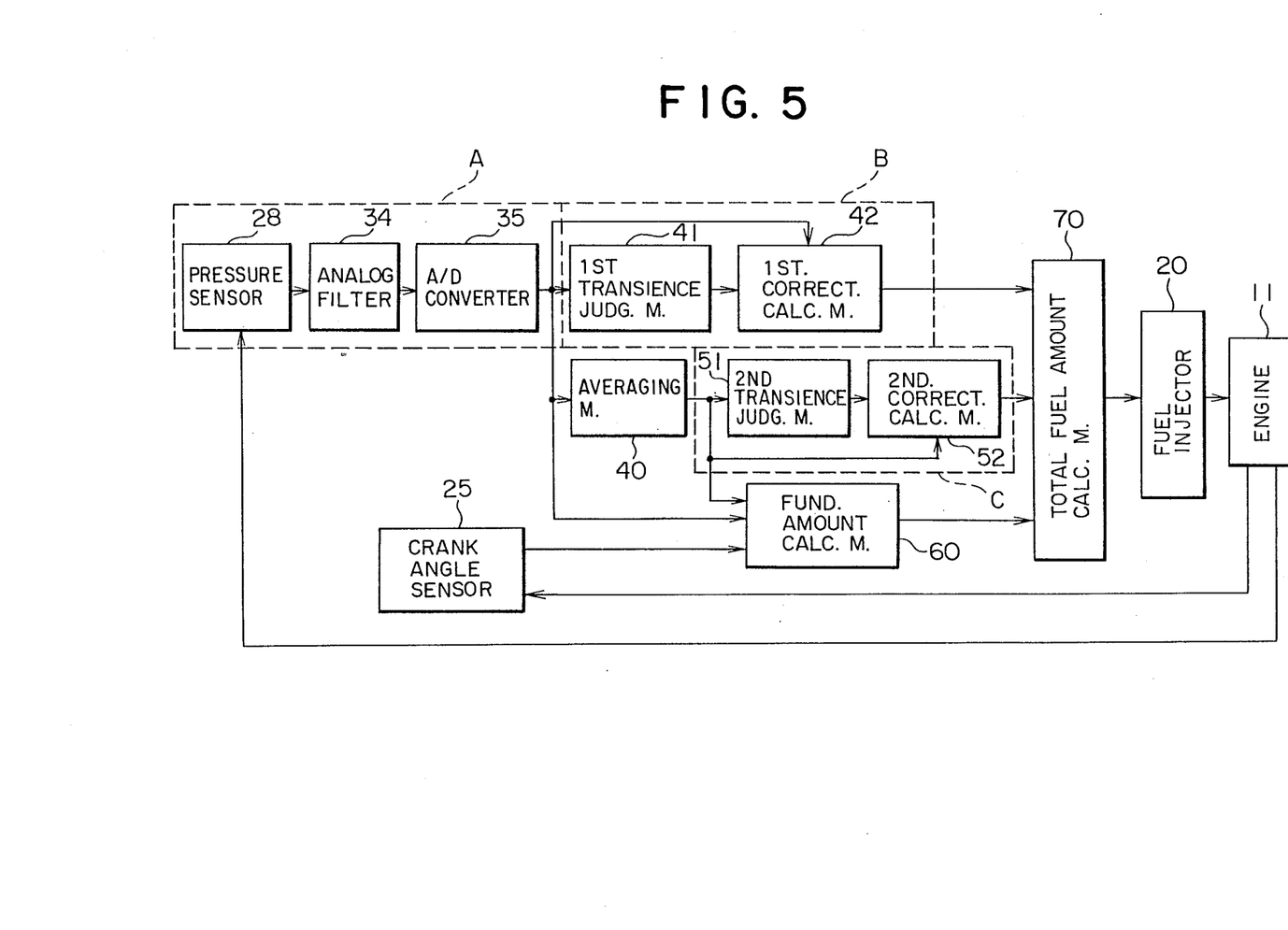
FIG. 5 is a block diagram showing the functional organization of the control device for controlling the amount of injected fuel acccording to the principle of this invention.

Let us now describe the general princple of this invention in reference to FIG. 5, which shows schematically the organization of microcomputer 33, together with those of the elements associated therewith, from the functional point of view. As shown in the figure, the device according to this invention comprises, in addition to the fundamental amouunt calculation means 60, the averaging means 40, and other associated elements, three main portions A through C: portion A for obtaining the intake air pressure data, portion B for determining the first correction amount corresponding to the first transient state of the engine, and portion C for determining the second correction amount corresponding to the second transient state of the engine; the total amount of fuel that is injected by the fuel injectors 20 into the air inlet passage to the engine 11 is determined by the total fuel amount calculaltion means 70 in accordance with the outputs of the portions B and C and the fundamental amount calculation means 60.

The portion A for obtaining the pressure data ccomprises the pressure sensor 28, the analog filter circuit 34, and the A/D converter 35. The pressure signal Sp outputted from the pressure sensor 28 is outputted to the filter circuit 34, which attenuates the ripples contained in the pressure signal Sp. The A/D converter 35 converts, at a predetermined fixed period $t_{AD}$ of the timing signal St (see FIG. 4 (c)), the output of the filter circuit 34 into a digital pressure data PBi corresponding to the pressure signal Sp.

The portion B for determining the first correction amount comprises a first transient state judgement means 41 and a first correction amount calculation means 42. The first transient state judgement means 41 calculates the variation or increment of the pressure data PBi over a first interval of time, and compares this increment of the pressure data PBi with a first threshold level to detect the first transient state of the engine 11. The first correction amount calculation means 42 calculates, when the first transient state judgement means 41 detects the first transient state of the engine, the first correction amount on the basis of the pressure data PBi outputted from the A/D converter 35. More specifically and more precisely, the means 41 and 42 of portion B may operate as follows:

The first transient state judgement means 41 calculates the increment $\Delta PBi$ of the pressure data over each fuel injection period 3T (see FIG. 4 (a) and (b)):

$$\Delta PBi = PBin - PBio,$$

wherein PBin and PBio are the values of the pressure data just before the current and the preceeding fuel injection effected in synchrony with every third pulse of the crank angle signal Sc. Further, the first transient state judgement means 41 compares this increment $\Delta PBi$ of the pressure data with a first threshold level $P_1$ to determine whether $$\Delta PBi \geq P_1$$

holds or not. In accordance with the result of this comparison by the first transient state judgement means 41, the first correction amount calculation means 42 calculates the first correction amount $Q_{A1}$ corresponding to the above increment $\Delta PBi$; an example of the method of calculation will be described below in reference to FIG. 8 (steps 307 through 309).

The averaging means 40 takes an average $PB_A$ of the pressure data PBi outputted from the A/D converter 35 over each predetermined interval of, for example, the crank angle signal Sc outputted from the crank angle sensor 25. A second transient state judgement means 51 of portion C calculates a variation or increment of the averaged pressure data $PB_A$ over a second predetermined length of time which is longer than the first interval of time, and compares this increment of the averaged pressure data $PB_A$ with a second threshold level, so as to determine the second transient state of the engine 11. A second correction amount calculation means 52 of the portion C calculates the second correction amount when the second transient state is detected by the second trnasient state judgement menas 51. More specifically and more precisely, the averaging means 40 and the means 51 and 52 of the portion B may operate as follows:

The averaging means 40 takes an average $PB_A$ of the pressure data PBi over each fuel injection period 3T. The second transient state judgment meaans 51 calculates an increment $\Delta PB_A$ of the averaged pressure data $PB_A$ outputted from the averaging means 40 over each second interval of time (which may be measured by means of a timer), and compares this increment $\Delta PB_A$ of the averaged pressure data $PB_A$ with a second threshold level $P_2$ so as to determine whether the inequality:

$$\Delta PB_A \geq P_2$$

holds or not. The second correction amount calculation means 52 calculates the second correction amount $QA_2$ corresponding to the increment $\Delta PB_A$ in accordance with the result of this comparison effected by the second transient state judgement means 51. More specific method of operation of the portion B is described in detail below in reference to FIG. 6 (steps 106 through 112, together with step 204 of FIG. 7).

The fundamental amount calculation means 60, on the other hand, calculates, at every third pulse of the crank angle signal Sc outputted from the crank angle sensor 25, the fundamental amount of fuel $Q_B$ on the basis, for example, of: (1) the averaged pressure data $PB_A$ outputted from the averaging means 40 when the first correction amount $Q_{A1}$ is equal to zero; and (2) the current pressure data PBin outputted from the A/D converter 35, when the first correction amount $Q_{A1}$ is greater than zero. The specific method of operation of the fundamental amount calculation means 60 is described hereinbelow in reference to FIG. 8 (steps 310 through 312).

The total fuel amount calculation means 70 calculates the total amount of fuel that is to be injected at every third pulse of the crank angle signal Sc on the basis of the first and second correction amounts $Q_{A1}$ and $Q_{A2}$ and the fundamental amount $Q_B$; when the engine 11 is provided with a supercharger 15, this determination of the total amount of fuel may be effected in this way: The number Ne of rpm of the engine 11 and the current value of the averaged pressure data $PB_A$ is compared with a predetermined number $N_1$ and a threshold level $P_3$, respectively; when both are not less than the predetermined number and the threshold level, respectively, it is decided that the engine 11 is in the supercharged state, and hence the total amount Q is calculated as the sum of the first and the second correction amount $Q_{A1}$ and $Q_{A2}$ and the fundamental amount $Q_B$:

$$Q = Q_{A1} Q_{A2} + Q_B.$$

On the other hand, when either the number Ne of rpm or the current vallue of the averaged pressure data PBA, or both, are less than their respective predetermined number and the threshold level, it is decided that the engine 11 is not in the supercharged state, and hence the total amount of fuel Q is calculated as the sum of the first correction amount $Q_{A1}$ and the fundamental amount $Q_B$:

$$Q = Q_{A1} + Q_B.$$

The above method of operation of the total amount calculation means 70 is described hereinbelow more specifically in reference to FIG. 8 (steps 313 through 316) The total amount calculation means 70, however, may determine the total amount simply as the sum of the fundamental amount and the first and second correction amount, irrespective of whether the engine is in the supercharged state or not; thus, the principle of this invention is also applicable to the engines which are not provided with a supercharger;

The fuel injector means 20 is driven for a length of time PW corresponding to the total amount of fuel Q determined by the total fuel amount calculation means 70. Thus, an amount of fuel corresponding to the total amount Q is injected into the air inlet passage to the engine 11 in synchrony with every third pulse of the crank angle signal Sc.

Referring now to FIGS. 6 through 8 of the drawings, let us describe an example of the steps which are followed by the fuel injection control device according to the present invention, the principle of which is shown in FIG. 5, whereby reference is also made to FIGS. 2 through 4.

FIG. 6 shows the main routine followed by the CPU 33A of FIG. 3; the main routine is started when the power source of the system is turned on. At step 101, the data stored in the RAM 33C are cleared to effect the initialization of the temporary data, etc. At the next step 102, the measurement value of the period Tc of the crank angle signal Sc (refer to FIG. 4 (a)) is read out from the RAM 33C to determine the number of rpm, Ne, of the engine 11 by means of the operation:

Ne=1/T; the number of rpm Ne thus obtained is stored in RAM 33C. At step 103, the number of rpm Ne and the current value of the averaged pressure data, $PB_An$, described hereinbelow, are read out from the RAM 33C, so as to determine the volumetric efficiency $\eta_v$ (Ne, $PB_An$) on the basis thereof. Namely, the values of volumetric efficiency for attaining a predetermined air-fuel ratio is stored in ROM 33B as a function (i.e. map) of the number of rpm and the pressure data, which function is determined beforehand by an experimental method; thus, the value of the volumetric efficiency $\eta_v$ (Ne, $PB_An$) corresponding to the pair (Ne, $PB_An$) can be read out from the ROM 33C by the mapping method. The value of the volumetric efficiency thus determined is stored in RAM 33C. After the step 103 for determining the volumetric efficiency, the program proceeds to step 104 at which the following detection signals are subjected to A/D conversion via the A/D converter 35, to be stored in RAM 33C: the coolant water temperature signal outputted from the water temperature sensor 26; the throttle opening degree signal outputted from the opening degree sensor 27; the intake air temperature signal from the air temperature sensor 29, and the air/fuel ratio signal outputted from the air/fuel ratio sensor 30. Further, at step 105, the detection data relevant to the determinatin of the fundamental amount of injected fuel, i.e. the coolant water temperature data, the intake air temperature data, and the air/fuel ratio data, are read out from the RAM 33C, to determine the composite correction factor $K_A$, which is a combination of the correction factors for correcting the fundamental amount of fuel, such as: the warming up correction factor corresponding to the coolant water temperature; the intake air temperature correction factor correspodning to the temperature of the intake air; and the feedback correction factor determined on the basis of the air/fuel ratio feedback signal. After the step 105, the program proceeds to steps 106 through 112 to determine, at a predetermined interval of time, the second augmentation of fuel.

Thus, at step 106, judgement is made whether the value T of of the timer has reached a predetermined magnitude $T_1$ or not; namely, judgement is made whether $T=T_1$ holds or not. If the judgement at step 106 is in the negative (i.e. $T \neq T_1$). the program returns to step 102; if, on the other hand, the judgement at step 106 is in the affirmative, the value of T is reset to zero (0) at step 107, to proceed to step 108, at which the current value of the averaged pressure data $PB_An$ (described below) is set as the first value $PB_{A1}$ of the averaged pressure data. Further, at step 109, the increment of the averaged pressure data over the predetermined time length corresponding to the timer value $T_1$ (referred to hereinafter as the predetermined time interval $T_1$), namely:

$$\Delta PB_A = PB_{A1} - PB_{A2},$$

is compared wiith a second predetermined threshold level $P_2$ to determine whether $$\Delta PB_A \geq P_2$$

holds or not, wherein $PB_{A1}$ is the first value of the averaged pressure data (i.e. the current value thereof) which is set at step 108, as described above, and $PB_{A2}$ is the value of the averaged pressure data $PB_A$ obtained at an instant of time the predetermined time interval $T_1$ before the present instant, i.e., the second value of the averaged pressure data set at step 112 described below.

When the judgement at step 109 is negative, the value of the second augmentation (i.e. transient augmentative correction for the slow acceleration state of the engine) amount $Q_{A2}$ is set at zero (0) at step 110; on the other hand, when the judgement at step 109 is affirmative, the value of the second augmentation $Q_{A2}$ is calculated at step 111 by, for example, multiplying the increment $\Delta PB_A$ of the pressure data over the predetermined time interval $T_1$, by a predetermined constant c; thus:

$$Q_{A2} = c \cdot \Delta PB_A;$$

the value of the second augmentation $Q_{A2}$ thus obtained is stored in the RAM 33C. Further, at step 112, the current first value $PB_{A1}$ of the pressure data is set and stored in the RAM 33C as the updated value of the second value $PB_{A2}$ of the averaged pressure data. After the step 112, the program returns to step 102 to repeat the above operations of the main routine.

FIG. 7 shows an interrupting routine occasioned by the timing signal of the timer, primarily for taking a accumulating sum of a number of successive pressure data which is used in calculating the averaged pressure data $PB_A$; at each end of the period $t_{Ad}$ of the A/D conversion timing signal St shown in FIG. 4 (c), an interrupt signal is generated to start this routine. At step 201, the output signal Sp of the pressure sensor 28 is, after being passed through the analog filter circuit 34, converted into a corresponding digital pressure data PBin by the A/D converter 35. At step 202, the new or current pressure data PBin is added to the accumulating sum of the pressure data, SUM, stored in the RAM 33C to obtain a new value of the accumulating sum of the pressure data SUM; this new accumulating sum, SUM, is stored in the RAM 33C together with the current pressure data PBin, so as to update the values thereof stored in the RAM 33C. At step 203, unity (1) is added to the number, N, of the times of the additions which has been effected at step 202, so as to obtain an updated number N, which is then stored in the RAM 33C. Further, at the final step 204 which concludes the interrupt routine of FIG. 7, unity (1) is added to the timer value T to update the value thereof; the updated value of T is stored in the RAM 33C.

FIG. 8 shows an interrupting routine occasioned by the crank angle signal Sc; each time a pulse of the crank angle signal Sc rises, a crank angle interrupt signal is generated to start this interrupting routine.

At step 301, the measurement value of the period Tc of the crank angle signal Sc is stored in the RAM 33C; this period Tc may be determined by a timer consisting of either a software or a hardware within the microcomputer 33. At step 302, unity (1) is added to the number of occurences, M, of the pulses of the crank angle signal Sc, to update the value of M. At step 303, judgment is made whether the number of occurences M of the pulses of the crank angle signal Sc is equal to three or not; if it has not yet reached three, the current value of M is stored in the RAM 33C to end the routine of FIG. 7 at step 303. If, on the other hand, the judgement at step 303 is affirmative (i.e. M=3), the value of M stored in the RAM 33C is reset to zero (0) at the subsequent step 304, to proceed to step 305. Thus, the following steps 305 through 318 are performed at each third pulse of the crank angle signal Sc to effect a fuel injection in synchrony therewith.

At step 305, the current average $PB_An$ of the pressure data PBi within a fuel injection period (which is equal to 3T as shown in FIG. 4 (a) and (b)) is obtained by dividing the accumulating sum of the pressure data SUM (which has been updated and stored in the RAM 33C at the immediately preceeding step 202) by the number of additions N (which has been updated and stored at the immediately preceeding step 203); namely:

$$PB_An = SUM/N.$$

At the next step 306, the values of the sum of the pressure data SUM and the number of additions N stored in the RAM 33C are cleared to zero (0). At step 307, the increment of the pressure data over the preceeding fuel injectin period 3T:

$$\Delta PBi = PBin - PBio,$$

is compared with the first threshold level $P_1$ to determine whether the inequality:

$$\Delta PBi \geq P_1$$

holds or not, wherein PBin is the current (instantaneous) value of the pressure data which has been obtained at the immediately preceeding step 201 (this current value PBin is the value of the pressure data that is obtained immediately before the current fuel injection cycle, i.e. immediately before the leading edge of the pulse of the crank angle signal Sc that is synchronized with the current injection of fuel), and PBio is the value of the pressure data that was obtained immediately before the preceeding fuel injection cycle, i.e. immediately before the leading edge of the pulse of the crank angle signal Sc that was synchronized with the preceeding fuel injection. If the judgement at step 307 is affirmative, the program proceeds to step 308; if, on the other hand, the judgment at step 307 is negative, the program proceeds to step 309.

At step 308, the first transient augmentation $Q_{A1}$ of the amount of injected fuel is maximized; more specifically, a candidate value $Q_{A1}$ of the first augmentation is calculated by multiplying the increment $\Delta PBi$ by a constant k:

$$Q_{A1} = k \cdot \Delta PBi,$$

and this candidiate value $Q_{A1}$ is compared with the previous value $Q_{A10}$ of the first augmentation which is stored in the RAM 33C, so as to selected the larger one of the two values $Q_{A1}$ and $Q_{A10}$ as the new maximized value $Q_{A1}$ of the first augmentation; this new maximized value of the first augmentation $Q_{A1}$ is stored in the RAM 33C. Incidentally, if preferred, the above candidate value may be used as the new (maximized) value of the first augmentation $Q_{A1}$ without comparing it with the previous value of the first augmentation.

On the other hand, at step 309, the first augmentation $Q_{A1}$ is decreased. Namely, the new decreased value of $Q_{A1}$ is obtained by subtracting a predetermined constant $\alpha$ from the previous value of the first augmentation, $Q_{A10}$, stored in the RAM 33C:

$$Q_{A1} = Q_{A10} - \alpha;$$

when, however, the result of the above subtraction is negative, the new decreased value of $Q_{A1}$ is clipped to zero. After the respective steps 308 and 309, the program proceeds to step 310.

At step 310, judgement is made whether the updated value of the first augmentation $Q_{A1}$ obtained at the preceeding step 308 or 309 is equal to zero or not, and the updated value of the first augmentation $Q_{A1}$ is stored in the RAM 33C immediately thereafter. If the judgement at step 310 is in the affirmative (i.e., $Q_{A1}=0$), the program proceeds to step 311, judging that the engine is not in the first transient state; on the other hand, if the judgement at step 310 is in the negative, the program proceeds to step 312, judging that the engine is in the first transient state. Thus, at step 311, the correction factor $K_A$, the volumetric efficiency $\eta_v$(Ne, $PB_An$), and the averaged pressure data $PB_An$, calculated at steps 105, 103, and 305 respectively, are read out from the RAM 33C; further the pressure-fuel conversion factor $K_Q$ is read out from the ROM 33B, so as to compute the fundamental amount of the injected fuel $Q_B$ by means of the equation:

$$Q_B = K_Q \times K_A \times \eta_v(Ne, PB_An) \times PB_An.$$

Similarly, at step 312, the necessary values are read out from the RAM 33C and ROM 33B to compute the fundamental amount $Q_B$ on the basis of the current value of the instantaneous pressure data PBin:

$$Q_B = K_Q \times K_A \times \eta_v(Ne, PBin) \times PBin.$$

After the step 311 or 312, the program proceeds to step 313.

At step 313, judgement is made whether the number of rpm Ne obtained at step 102 is compared with a predetermined number of rpm $N_1$ to determine whether $$Ne \geq N_1$$

holds or not. When the judgemnt at step 313 is affirmative, the program proceeds to step 314, at which the current value $PB_An$ of the averaged pressure data is compared with a third threshold level $P_3$ to determine whether $$PB_An \geq P_3$$

holds or not; when the judgement at step 314 is affirmative, it is decided that the engine is in the supercharged region (in which the amplitude of the ripples contained in the pressure data becomes large, as shown in FIG. 1), and the program proceeds to step 315. Thus, at step 315, the total amount of fuel Q that is to be injected in the current fuel injection cycle is calculated as the sum of the first and the second augmentation, $Q_{A1}$ and $Q_{A2}$, and the fundamental amount $Q_B$:

$$Q = Q_{A1} + Q_{A2} Q_B.$$

If, on the other hand, either the judgement at step 313 or that at step 314 is in the negative, it is decided that the engine is not in the supercharged state, and the program proceeds to step 316. Thus, at step 316, the total amount of fuel Q is calculated only as the sum of the first augmentation $Q_{A1}$ and the fundamental amont $Q_B$:

$$Q = Q_{A1} + Q_B.$$

Further, at step 317, the length of time PW during which the injectors 20 are driven is calculated. Namely, the fuel to driving time conversion factor $K_{INJ}$ and dead time $T_D$ are read out from the ROM 33B to compute the driving time PW by means of the equation:

$$PW = Q \times K_{INJ} + T_D.$$

At step 318, the injector driving time PW is set in the timer 33D, which is thus put into operation for the time length PW; during the time PW in which the timer 33D is operating, the pulse-shaped injector driving signal Sj is applied to the injectors 20 via the driving circuit 36, so that the amount of fuel correspodning to the total amount Q is injected into the air inlet passage to the engine 11. At the final step 319 which conculdes the interrupt routine of FIG. 8, the current pressure data PBin obtainend immediately before the current fuel injection cycle is stored in the RAM 33C as the value of PBio, which is to be used at step 307 in calculating the increment of the pressure data at the next fuel injection cycle.

Incidentally the steps 313, 314, and 316 may be omitted, whereby the step 315 follows directly the step 311 or 312; in such case, the slow accelerating correction of the fuel amount via the second augmentation $Q_{A2}$ can be effected also in the case where the engine is not in the supercharged region, and substantially the same advatage as in the above example of steps can be obtained. Further, although the above description has been made of the case where the engien comprises a supercharger, the principle of this invention is applicable to the engines without superchargers.

In the embodiment described above, the suppression of the ripples contained in the intake air pressure signal is effected, near the maximum rpm of the engine for example, both by the averaging of the pressure data over each one of the fuel injection periods and by the attenuation of the high frequency components by the analog filter circuit 34. Thus, the adverse effects of the ripples contained in the air pressure signal can be removed substantially if the attenuation characteristics of the analog filter circuit 34 and the period $t_{AD}$ of the A/D conversion timing of the pressure signal are selected in such a manner that the sufficient response speed for the transient acceleration judgement is retained while the erroneous detections of the transient state due to the ripples are avoided.

By the way, it would be apparent to those skilled in the art that the ignition pulse signal at the primary side of the ignition coil 22 may be used as the crank angle signal Sc in the above described fuel injection device; it goes without saying that such modifications are comprised within the scope of this invention. Thus, while description has been made of the particular embodiments of this invention, it will be understood that many modifications may be made without departing from the spirit thereof; the appended claims are contemplated to cover any such modifications as fall within the true spirit and scope of this invention.

What is claimed is:

1. A fuel injection device for injecting a controlled amount of fuel into an air inlet passage to a cylinder of a spark ignition type internal combustion engine, said fuel injection device comprising:

pressure detector means for detecting an air pressure within the air inlet passage to the cylinder of the internal combustion engine, said pressure detector means outputting a pressure data corresponding to the detected pressure;

first increment calculation means for calculating an increment of the pressure data outputted from the pressure detector means over a first interval of time;

first comparator means, coupled to said first increment calculation means, for comparing with a first threshold level said increment of the pressure data over the first interval of time, so as to detect a first transient state of the internal combustion engine;

first correction amount calculation means, coupled to said first increment calculation means and first comparator means, for calculating, in accordance with a detection of the first transient state by the first comparator means, a first transient correction amount corresponding to said increment of the pressure data over the first interval of time;

averaging means, coupled to said pressure detector means, for averaging the pressure data outputted from said pressure detector means over each passage of an interval of time;

second increment calculation means, coupled to said averaging means, for calculating an increment of the averaged pressure data outputted from said averaging means, over a second interval of time which is longer than said first interval of time;

second comparator means, coupled to said second increment calculation means, for comparing with a second threshold level the increment of the averaged pressure data over said second interval of time, so as to detect a second transient state of the internal combustion engine;

second correction amount calculation means, coupled to said second increment calculation means and said second comparator means, for calculating, in accordance with a detection of the second transient state, a second transient correction amount corresponding to said increment of the averaged pressure data over the second interval of time;

fundamental amount calculation means, coupled to said pressure detector means, for calculating, on the basis of the pressure data, a fundamental amount of fuel that is to be injected by the fuel injection device;

total amount calculation means, coupled to said first and second correction amount calculation means and said fundamental amount calculation means, for calculating a total amount of fuel from said first and second correction amount and said fundamental amount; and fuel injector means, coupled to said total amount calculation means, for injecting into the air inlet passage to the cylinder of the internal combustion engine an amount of fuel equal to said total amount of fuel calculated by said total amount calculation means.

2. A fuel injectin device as claimed in claim 1, wherein:

said internal combustion engine comprises a supercharge;

said fuel injection device further comprises supercharged state detector means for detecting a supercharged state of the internal combustion engine; and said total amount calculation means is coupled to said supercharged state detector means, and, when a supercharged state is detected by the supercharged state detector means, calculates the total amount as a sum of the first and second transient correction amount and the fundamental amount, whereas said total amount calculation means calculates, when a supercharged state is not detected by the supercharged state detector means, the total amount as a sum of the first transient correction amount and the fundamental amount.

3. A fuel injection device as claimed in claim 2, wherein said supercharged state detector means comprises:
rotational speed detector means for detecting a number of revolutions per minute of the internal combustion engine;
rotational speed judgement means, coupled to said rotational speed detector means, for comparing with a predetermined number said number of revolutions per minute of the internal combustion engine; and
third comparator means, coupled to said averaging means, for comparing with a third threshold level the averaged pressure data currently outputted from the averaging means;
wherein said supercharged state detector means detects a supercharged state of the internal combustion engine when both said number of revolutions per minute and said current averaged pressure data are not less than said predetermined number and said third threshold level, respectively.

4. A fuel injection device as claimed in any one of claims 1 through 3, wherein said fundamental amount calculation means is further coupled to said averaging means and said first correction amount calculation means, and calculates the fundamental amount on the basis of the averaged pressure data currently outputted from said averaging means when said first transient correction amount is equal to zero, whereas said fundamental amount calculation means calculates the fundamental amount on the basis of pressure data currently outputted from the pressure detector means, when said first transient correction amount is greater than zero.

5. A fuel injection device as claimed in any one of claims 1 through 3, further comprising:
crank angle sensor means for detecting a predetermined angle of a crank shaft of the internal combustin engine, said crank angle sensor means outputting a crank angle signal which comprises pulses each corresponding to the predetermined angle of the crank shaft of the internal combustion engine;
wherein said fuel injector means injects said total amount of fuel in synchrony with every predetermined numberth pulse of the crank angle signal.

6. A fuel injection device as claimed in any one of claims 1 through 3, wherein said first increment calculation means calculates the increment of the pressure data over each interval of time between two successive fuel injections effected by said fuel injection device.

7. A fuel injection device as claimed in any one of claims 1 through 3, wherein said averaging means takes an average of the pressure data over each internal of time between two succesive fuel injections effected by said fuel injection device.

8. A fuel injection device as claimed in claim 1, wherein: said first correction amount calculation means maximizes the first transient correction amount when the first comparator means detects the first transient state of the internal combustion engine, and decreases the first transient correction amount when the first comparator means does not detect the first transient state of the internal combustion engine.

9. A fuel injection device as claimed in claim 1, wherein: said second correction amount calculation means calculates the second transient correction amount by multiplying by a predetermined constant the increment of the averaged pressure data over the second interval of time, when said second comparator means detects the second transient state of the internal combustion engine; whereas said second correction amount calculation means reduces the second transient correction amount to zero, when said comparator means does not detect the second transient state of the internal combustion engine.

* * * * *